INVENTOR
ROBERT J. BRETL
ATTORNEY

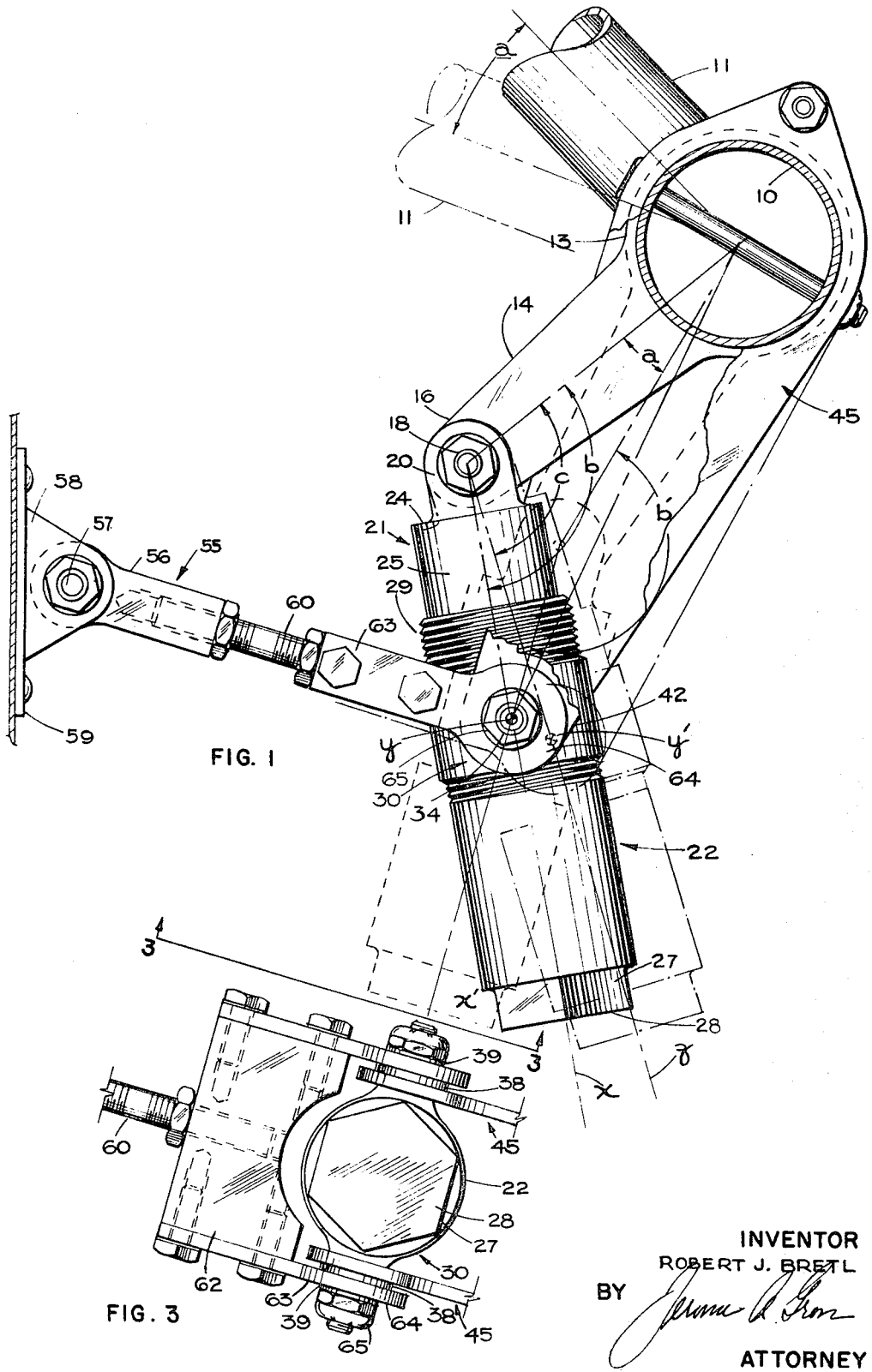

United States Patent Office 3,429,198
Patented Feb. 25, 1969

3,429,198
PIVOTING SPRING CAPSULE TRIM APPARATUS FOR HELICOPTER ROTOR COLLECTIVE PITCH CONTROL
Robert J. Bretl, Menominee, Mich., assignor to R. J. Enstrom Corporation, Menominee, Mich., a corporation of Michigan
Filed Mar. 28, 1967, Ser. No. 626,474
U.S. Cl. 74—523
Int. Cl. G05g 1/04
5 Claims

ABSTRACT OF THE DISCLOSURE

For use in a helicopter collective pitch control system, a compression spring capsule on a trunnion mount, exerting its force against a lever on the pitch control torque shaft, supplies torsional moment to achieve trim at design r.p.m., throughout the entire range of blade pitch angles. When the pilot positions the collective pitch control to reduce the blade pitch angle, increased compressive deflection of the spring capsule turns it on its trunnion mount, more nearly into alignment with the lever, thus to reduce the torsional moment it exerts on the shaft. By adjusting the trunnion mount position and the precompression of the spring, the curve of torsional moment exerted by the spring capsule may be closely matched to the curve of torsion applied by the rotating rotor.

Background of the invention

The collective pitch control of helicopter rotors, used to increase or decrease the pitch of all rotor blades simultaneously, is conventionally a lever extending from a torque shaft, movable in an arc between upper and lower blade pitch limit stops. Rotation of the blades imposes a tendency for the blades to go into flat pitch. Other demands on the pilot make it important that the collective pitch control system be "trimmed," to relieve the pilot of the need to continuously oppose this tendency. A desired condition of trim is that the collective pitch control should stay wherever the pilot sets it, and yet be readily moved to another setting, in which it will likewise stay until changed by the pilot.

Many types of devices have been used to achieve trim, including those which impose high friction on the system, and those which impose a spring force which is effective at some one particular collective pitch blade angle, at a design rate of rotor revolution; but is unsuitable at other pitch angles. The present invention makes it unnecessary to use any device characterized by high friction. It is especially useful in that type of helicopter operation where the rotor r.p.m. will normally be a fairly constant design value.

Summary of the invention

The moment imposed on the collective pitch control system by the blades rotating at a typical or "design" rate, will be at a maximum when the collective stick is against the upper pitch limit stop; and will drop off more and more as the stick angle is reduced, in a characteristic curve. The present invention provides a compressible, partly precompressed spring capsule which exerts its force against a lever on the collective pitch control torque shaft, to urge it toward engagement with the upper pitch limit stop. The capsule is supported on a trunnion axis parallel to the torque shaft axis. The axis of the compressible capsule is at an angle greater than 90° to the lever when the upper pitch limit stop is engaged, and turns on its trunnion mount to a greater angle, more nearly in alignment with the lever, as it is further compressed. Although the force of the spring increases with such further compression, the torque moment which the capsule exerts on the shaft decreases as it turns toward alignment with the lever.

The curve of variation of such exerted torque moment with collective stick position is generally similar to the curve of movements applied by the blades rotating at a selected design r.p.m. By adjusting both the precompression of the spring capsule and the position of the trunnion axis, this exerted torque moment curve is brought into close coincidence with the applied moment curve. Precompression is adjusted by screwing the spring capsule cylinder, which is externally threaded, in an internally threaded ring of the trunnion mount; while the position of the trunnion axis is changed by mounting it on an adjustable bracket. In the preferred embodiment, this bracket includes one member which is angularly adjustable on a bushing about the torque axis, and a second member which is variably secured, for example, by adjusting its length.

Brief description of the drawings

In the accompanying drawings:

FIG. 1 is a side elevation, partly broken away, of a preferred embodiment of the improved trim apparatus of the present invention, the parts being shown in position for maximum collective pitch angle at one position of the trunnion axis. The dashed lines show the change in position of the parts when moved to minimum collective pitch angle. The phantom lines show the change in spring capsule position at maximum collective pitch angle which results from repositioning the trunnion axis somewhat to the right.

FIG. 3 is a fragmentary bottom view as seen along line 3—3 of FIG. 1, showing the spring capsule in its position at minimum collective pitch angle.

Description of the preferred embodiment

Figures 2, 4:
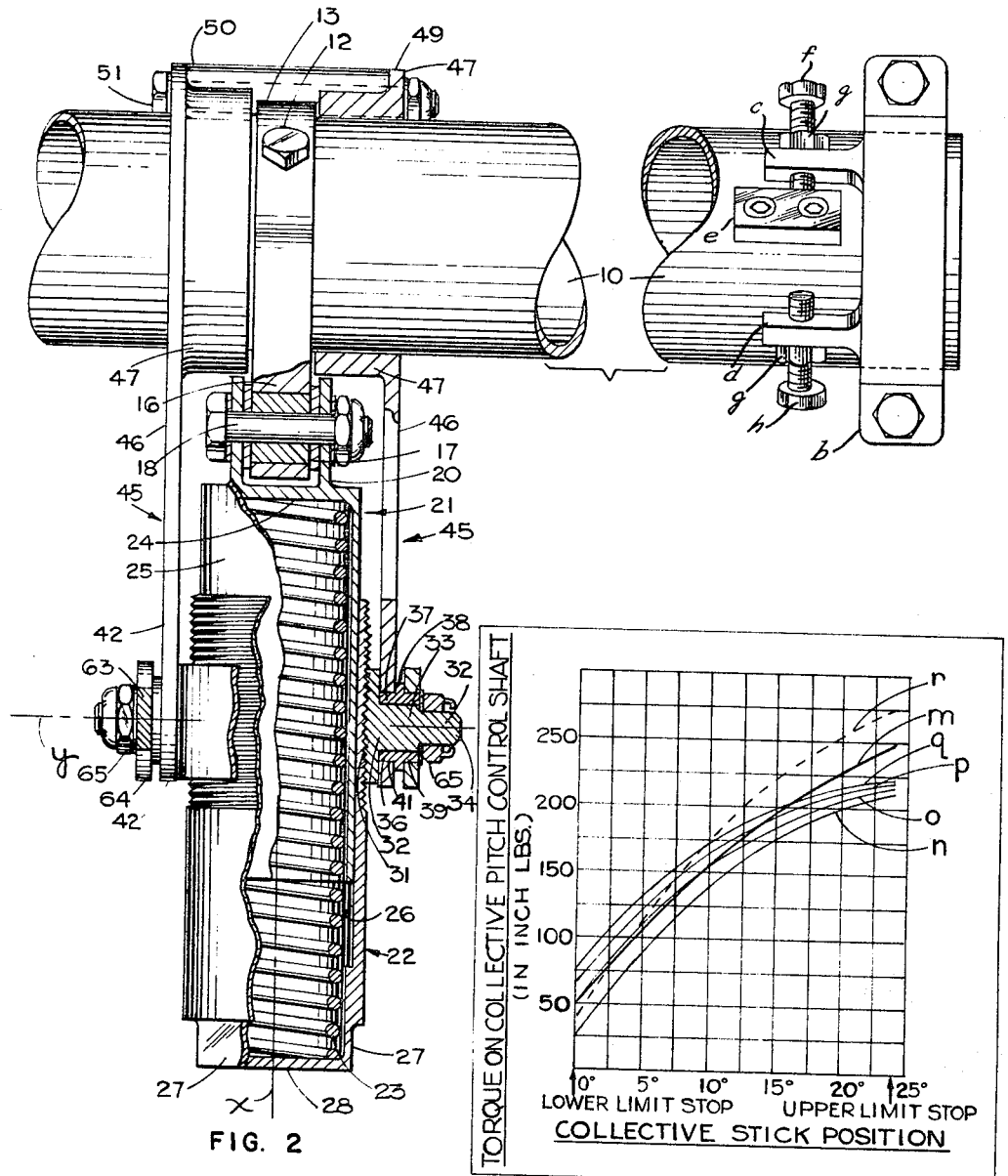
FIG. 2 is a fragmentary front view, partly in elevation and partly in section, of the trim apparatus of FIG. 1.
FIG. 4 is a graph showing how, by adjustments of the present trim apparatus, the torque exerted by it on the collective pitch control shaft may be matched to the torsion applied by the rotor rotating at design speed.

In conventional helicopters, the pitch control torque shaft designated 10 in FIGS. 1 and 2 may extend horizontally, laterally across the helicopter cabin beneath the pilot's seat. It is operated by a collective pitch stick, designated 11 and shown in a schematic fragment in FIG. 1. The fragment there shown in solid lines is at its maximum angle, for maximum collective pitch, its movement being limited by a conventional upper pitch limit stop, to be described. It is capable of movement through an angle $a$ to a lowered position against a conventional lower pitch limit stop (to be described) for minimum collective pitch angle, as shown in dashed lines. In a conventional helicopter such angular range of movement $a$ of the collective stick 11 may be generally between 20° and 25°.

When a helicopter rotor system is rotated, the dynamics of the system result in a tendency for the rotor blades to go into flat pitch. Unless there is much friction in the control system, holding the blades at a positive pitch angle will require a balancing control force. When, as shown, the collective stick 11 operates a control torque shaft 10, the balancing force may be exerted through it as a torque. Such torque (which otherwise the pilot might be required to exert) to hold the blades at a chosen collective pitch angle, may instead be imposed by the trim apparatus now to be described.

Mounted on to the pitch control torque shaft 10 by a securement bolt 12 is the securement ring portion 13 of an outstanding lever 14. Within a bore in its outstanding lever end 16, the lever 14 has a pivot bushing 17 whose axis is parallel to the axis of the torque shaft 10. A pivot bolt 18 through the bushing 17 mounts, outwardly of both sides of the outstanding lever end portions 16, the clevis end 20 of an elongated hollow cylindrical piston generally designated 21. This piston 21 telescopes within an elongated hollow cylindrical cup generally designated 22; these parts together enclose a compression spring 23; and as assembled they are hereinafter referred to as a compression spring capsule. The clevis end 20 of the piston 21 serves with the pivot bolt 18 to apply the spring force of such capsule as a torque which resists the tendency of the rotor blades to flatten their collective pitch angle.

The hollow piston 21 includes a head plate 24 and a smoothly finished outer cylinder wall 25 which glides telescopingly within a polished inner wall 26 of the cylindrical cup 22, machined at its lower end to provide wrenching flats 27 and terminating in an integral base plate 28. The ends of the spring 23 urge the head plate 24 and base plate 28, away from each other, along an axis of compression $x$ defined by the telescoping of the piston 21 within the cup 22. The head plate 24 and the base plate 28 thus serve as opposed end portions of the spring capsule.

An adjustable trunnion support for the spring capsule is provided, as follows: Commencing with its upper edge and extending downwardly for a substantial part of its axial length, the outer surface of the elongated hollow cylinder 22 has external screw threads 29. A broad ring, generally designated 30, whose depth is less than this threaded length, has mating internal threads 31. Extending from the ring 30 and diametrically opposite to each other on a common axis $y$, are opposed trunnion pin mounts 32, each including an inner cylindrical trunnion surface 33 and an outwardly projecting threaded portion 34. A sleeve bearing 36, fitted on the inner trunnion surface 33, includes an inner bearing portion 37, a central separator flange 38, and an outer bearing portion 39.

Bracket means are provided to position the trunnion means adjustably in an arc about the axis of the shaft 10. Mounted on the trunnion's inner bearing portions 37 are bearing bores 41 through outer ends 42 of a pair of bracket members 45 generally designed 45. The bracket members 45 extend to and around the shaft 10. In FIG. 1 the bracket member 45 nearest the eye is shown partly broken away; behind the capsule and the outstanding lever 14, the other bracket member 45 is visible. Each of the bracket members 45 includes a plate-like portion 46 which extends from the outer bracket ends 42 broadeningly to a width greater than the diameter of the shaft 10, where each incorporates a bushing mount portion 47 which fits on the shaft 10 for easy angular adjustment. The bushing mount portions 47 may be integral as shown in FIG. 2; they extend inwardly toward each other so as to flank both sides of the securement ring portion 13 of the outstanding lever 14. On the side of the shaft 10 opposite to the outer bracket ends 42 each of the plate-like portions 46 has an extended lobe portion 49. A hollow tubular spacer 50, held by a spacer bolt 51 between the lobe portions 49 of the two bracket members 45, avoids binding about the ring portion 13, and serves with the trunnion pin mounts to make the pair of brackets 42 function together and thus to space the axis $y$ of the trunnion mounts 32 parallel to and at a fixed radial distance from the shaft 10.

The precise angular position about the shaft 10 at which the trunnion axis $y$ will be adjustably established, is determined by a variably securable rigid member, generally designated 55 in FIG. 1. This member 55 serves with the pair of bracket members 45 as part of what functionally is a means to position the trunnion axis $y$ at such distance from the axis of the shaft 10 as to establish an angle at the pivot bolt 18 between the axis of compression $x$ and the outstanding lever 14. As shown in FIG. 1, this angle designated $b$ is greater than 90° when the collective stick 11 is moved to its position against the upper pitch limit stop (not shown); when the stick 11 is moved to a position against the lower pitch limit stop, such angle becomes the larger angle $b'$, which approaches, but never equals, 180°.

In the embodiment shown, the variably securable rigid member 55 is a yoke, variable in length and rigid in the sense that its length, when fixed, prevents any movement of the trunnion axis $y$. It includes a short rod 56 mounted by a bolt 57 through a clevis fitting 58 riveted to any conveniently located fixed-position structural member 59 of the helicopter. The axis of the bolt 57 is parallel to the trunnion axis $y$. A turnbuckle provision 60 at the opposite end of the rod 56 adjustably positions a heavy yoke cross-member 62, shown in FIG. 3, to whose outer sides are bolted parallel yoke arms 63, which terminate in rounded ends 64, bored to fit onto the outer bearing portions 39 of the sleeve bearings 36 on the trunnion pin mounts 32. Locking nuts 65, on the threaded portions 34 of the trunnion mounts 32 outwardly of the sleeve bearings 36, complete the assembly.

Conventional adjustable upper and lower pitch stops are provided to limit the angular movement of the collective pitch stick 11. Thus, a pillow block bearing $b$ which supports the end of the torque shaft 10, as shown in FIG. 2, may have upper and lower pitch stop projections $c$, $d$ projecting parallel to the axis of the shaft 10 and spaced angularly from a stop abutment $e$ bolted onto the shaft 10. In the upper pitch limit position, shown in FIG. 2, the stop abutment $e$ is in contact with the end of an adjustable upper stop bolt $f$, mounted by threads through a tapped hole in the upper pitch stop projection $e$ and secured in desired adjustment by a lock nut $g$. The lower limit position is established by a similarly mounted lower stop bolt $h$ and its lock nut $g$.

In adjusting the present apparatus for use, the lever 14 is moved to turn the shaft 10 against the upper pitch limit stop bolt $f$, and the cup 22 is screwed upward in the ring 30 until the spring 23 is compressed an amount calculated to give it a known pre-compression force, which acts along the axis $x$, at an angle $b$ to the lever 14. Since the angle $b$ is greater than 90°, the effective moment arm of the spring force will be less than the length of the lever 14 from the center of the shaft 10 to the pivot bolt 18.

If now the pilot moves the collective control stick 11 through the angle $a$ to its position against the lower pitch limit stop bolt $h$, the lever 14 will move through the same angle $a$, driving the piston 21 telescopingly downward into the cup 22 to further compress the spring 23, and moving the parts to the positions shown in dashed lines in FIG. 1. Such further compression of the spring 23 will linearly increase the spring force. However, the pivot bolt 18 will have been driven by the lever 14 to a new position designated 18'; and this increased spring force will be exerted along an axis $x'$ which is more nearly aligned with the lever arm; that is, the angle $b'$ between them at the new position 18' will be much closer to 180°. The spring rate of the spring 23 is chosen so that this decrease in moment arm more than offsets the increase in spring force due to increased compression. Therefore, moving the pitch lever to lower the collective pitch angle will reduce the torque moment exerted by the spring capsule.

The graph FIG. 4 will aid in understanding how the present apparatus is adjusted to offset the rotor-applied torque at design rotor speed of rotation. The heavy curve $m$ shows the actual measured torque applied to the control shaft 10 at such design rotor speed by the rotating masses of the rotor system of a typical small helicopter at all angles of collective pitch stick position, 0° indicating its position against the lower limit stop and 24° being its position against the upper limit stop. The purpose of the present trim apparatus is to impose an equal offsetting torque throughout this range of stick positions.

Curves $n$, $o$, $p$ and $q$ are a family of offsetting torque curves obtained, one for each of four different positions of the trunnion axis $y$, at the same precompression of the spring 23. The position of the trunnion axis is adjusted by lengthening or shortening the turnbuckle provision 60. With the lever 14 in full upward position as shown in solid lines in FIG. 1, lengthening the turnbuckle 60 will swing the bracket members 45 on their bushing mounts 47, angularly about the shaft 10, moving the trunnion axis $y$ into the new position $y'$, the new positions of the parts being shown in phantom lines. The capsule will thus be so rotated about the bolt 18 that its compression axis designated $z$ will be set at a new angle $c$ to the lever 14. The angle $c$ though greater than 90° is nearer to 90° than the lower angle $b$; hence the effective moment arm of the precompression force of the spring will be increased.

With the pitch control stick 11 against the upper limit stop, as shown at the right side of the graph FIG. 4, the increase in torque moment effected by progressively lengthening the turnbuckle's provision to provide the family of curves $n$, $o$, $p$, and $q$ will be of small magnitude. However, the difference in torque is much greater when the shaft 10 is turned toward the lower limit stop, for at lower collective pitch angles the compression axis will not tend to come close to alignment with the lever 14. Hence the slope of the curve of torque vs. angle of collective pitch is determined in a large measure by the change in trunnion axis position.

Curve $r$ shows the effect of increasing precompression of the spring 23 as compared with curve $n$, by turning the cup 22 higher in the threaded ring 30. Curve $r$ illustrates that the torque exerted by the spring capsule at maximum angle of collective stick position, is much increased by additional precompresion, which has little effect at minimum angle.

Thus, by adjustment of both the precompression spring force and the position of the trunnion axis, as described, the curve of torque exerted by the spring capsule may be brought into very close coincidence with the curve $m$ of torque applied by the rotor system at any chosen rate of rotation.

Variations in construction and installation of trim apparatus embodying the present invention will occur to those familiar with the problems of helicopter controls. Accordingly this invention is not to be construed narrowly, but rather as fully coextensive with the claims.

I claim:

1. For use with a helicopter rotor having a collective pitch control system which includes a shaft member movable through an arc about an axis, and upper and lower pitch limit stops fixing the limits of said arc,
    improved apparatus to trim out the tendency of the rotor blades to lessen their pitch, which comprises
    a lever secured to and outstanding from such shaft member,
    compressible spring force exerting means having opposed end portions and an axis of compression therebetween and being characterized by a preset partly compressed length,
    means, pivotable on an axis parallel to the shaft axis and connecting one of said end portions to an outstanding portion of said lever, to exert the spring force as a resisting torque on the shaft member, whereby to urge it toward engagement with such upper pitch limit stop, at which engagement the compressible means is at its length of preset compression,
    trunnion means associated with the other end portion to support the compressible means on a trunnion axis parallel to the shaft axis,
    and bracket means to position said trunnion means at such distance from the shaft axis as to establish an angle between the axis of compression and the outstanding lever which angle is greater than 90° when the upper pitch limit stop is so engaged,
    whereby, when arcuate movement of the shaft member imposes further compression on said compressible means,
    said angle is increased by turning in said trunnion means of said compressible means more nearly toward alignment with the lever, thus to decrease the effective moment arm at which said compressive means exerts its force.

2. Improved trim apparatus as defined in claim 1,
    wherein the said bracket means includes a pair of bracket members having bushing mount portions on the shaft member flanking the securement of the lever thereto and thus held by said lever in axial position on the shaft member, whereby said bushing mount portions permit the bracket means to be angularly positioned with reference to the axis thereof, and
    a securable rigid member having a support point remote from said axis,
    whereby its securement sets the angular position of the first bracket member and thereby adjustably establishes the position of the trunnion axis.

3. Improved trim apparatus as defined in claim 1,
    wherein the said bracket means includes a first bracket member having a bushing mount on the shaft member of the collective pitch control system, whereby it may be angularly positioned with reference to the axis thereof, and
    a variably securable rigid member having a support point remote from said axis,
    whereby variation in its securement sets the angular position of the first bracket member and thereby adjustably establishes the position of the trunnion axis.

4. Improved trim apparatus as defined in claim 3,
    wherein the second-mentioned end portion of the compressible means includes an elongated hollow cylinder and the first-mentioned end portion includes a piston reciprocable therein against a compression spring within the cylinder, and
    wherein the variably securable rigid member includes a yoke portion supporting the trunnion means on opposite sides of the hollow cylinder.

5. Improved trim apparatus as defined in claim 4,
    wherein the trunnion means associated with the said second-mentioned end portion comprises
    an internally threaded ring having diametrically opposed trunnion pin mount provisions and
    mating external screw threads about said hollow cylinder for a portion of its axial length exceeding the threaded length of the ring,
    whereby screw adjustment of the axial position of the cylinder within the threaded ring adjusts the preset compression of the spring against such upper pitch limit stop.

References Cited

UNITED STATES PATENTS 2,995,043    8/1961    Lusk et al. _____ 74—97
3,096,045    7/1963    Hendrickson et al. __ 244—83 X ROBERT A. O'LEARY, *Primary Examiner.*

W. E. WAYNER, *Assistant Examiner.*

U.S. Cl. X.R.

74—97, 100; 170—160.25; 244—83